United States Patent
Tirumala et al.

(10) Patent No.: US 12,416,260 B2
(45) Date of Patent: Sep. 16, 2025

(54) TURBINE ENGINE INCLUDING A STEAM SYSTEM

(71) Applicant: General Electric Company, Evendale, OH (US)

(72) Inventors: Rakshit Tirumala, Bengaluru (IN); Sushilkumar Shevakari, Bengaluru (IN); Arthur W. Sibbach, Boxford, MA (US); Jeffrey D. Rambo, Mason, OH (US); Bhaskar Nanda Mondal, Bengaluru (IN); Vaibhav M. Deshmukh, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/066,697

(22) Filed: Feb. 28, 2025

(65) Prior Publication Data

US 2025/0243802 A1    Jul. 31, 2025

Related U.S. Application Data

(62) Division of application No. 18/538,037, filed on Dec. 13, 2023, now Pat. No. 12,241,406.

(51) Int. Cl.
*F02C 3/30* (2006.01)
*F02C 3/04* (2006.01)

(52) U.S. Cl.
CPC .................. *F02C 3/30* (2013.01); *F02C 3/04* (2013.01); *F05D 2240/35* (2013.01)

(58) Field of Classification Search
CPC ........... F02C 3/30; F02C 3/04; F05D 2240/35
See application file for complete search history.

(56) References Cited

U.S. PATENT DOCUMENTS

| 2,447,696 A | 8/1948 | Archibald |
| 3,729,930 A | 5/1973 | Williams |

(Continued)

FOREIGN PATENT DOCUMENTS

| CN | 107725192 A | 2/2018 |
| FR | 3127269 A1 | 3/2023 |

(Continued)

OTHER PUBLICATIONS

Slides from Sustainable Water-Injecting Turbofan Comprising Hybrid-Electrics (Switch) Introduction at the 2023 NPSS Annual Consortium Meeting, Mar. 10, 2023.

(Continued)

*Primary Examiner* — Jesse S Bogue
(74) *Attorney, Agent, or Firm* — Venable LLP; David D. Leege; Michele V. Frank

(57) ABSTRACT

A turbine engine for an aircraft including a turbo-engine, a fan having a fan shaft coupled to the turbo-engine, and a steam system. The steam system is fluidly coupled to a core air flow path at a plurality of steam injection locations to selectively inject steam into the core air flow path at each of the plurality of steam injection locations, using a steam flow control valve. The plurality of steam injection locations include (i) an upstream steam injection location located to inject steam into the core air flow path at a primary combustion zone of a combustor or upstream thereof and (ii) a downstream steam injection location located to inject steam into the core air flow path downstream of the primary combustion zone.

20 Claims, 8 Drawing Sheets

(56) References Cited

U.S. PATENT DOCUMENTS

| | | | |
|---|---|---|---|
| 4,569,195 A * | 2/1986 | Johnson | F01K 21/047 60/39.55 |
| 4,631,914 A | 12/1986 | Hines | |
| 4,660,376 A | 4/1987 | Johnson | |
| 4,955,191 A * | 9/1990 | Okamoto | F23R 3/286 60/39.55 |
| 4,982,564 A | 1/1991 | Hines | |
| 5,170,622 A * | 12/1992 | Cheng | F01K 21/047 60/39.55 |
| 5,896,740 A | 4/1999 | Shouman | |
| 6,012,279 A | 1/2000 | Hines | |
| 6,260,350 B1 * | 7/2001 | Horii | F02C 7/1435 60/39.53 |
| 6,293,086 B1 * | 9/2001 | Reynolds | F02C 6/18 60/39.55 |
| 6,502,403 B1 * | 1/2003 | Tazaki | F02C 7/16 60/39.55 |
| 8,567,177 B1 | 10/2013 | Drori et al. | |
| 8,813,473 B2 | 8/2014 | Fletcher et al. | |
| 10,088,160 B2 * | 10/2018 | Koganezawa | F23L 7/005 |
| 11,459,948 B2 | 10/2022 | Uechi et al. | |
| 11,519,303 B2 | 12/2022 | Uechi et al. | |
| 11,530,650 B2 | 12/2022 | Galle et al. | |
| 11,530,652 B2 | 12/2022 | Madden et al. | |
| 11,603,796 B2 | 3/2023 | Diosady et al. | |
| 11,603,798 B1 | 3/2023 | Terwilliger et al. | |
| 2017/0022900 A1 | 1/2017 | Miller et al. | |
| 2019/0309685 A1 | 10/2019 | Stillman et al. | |
| 2021/0001269 A1 | 1/2021 | Klingels | |
| 2021/0207500 A1 | 7/2021 | Klingels et al. | |
| 2023/0258130 A1 | 8/2023 | Terwilliger et al. | |
| 2023/0374911 A1 | 11/2023 | Terwilliger et al. | |

FOREIGN PATENT DOCUMENTS

| | | |
|---|---|---|
| FR | 3130896 A1 | 6/2023 |
| FR | 3130897 A1 | 6/2023 |
| FR | 3133367 A1 | 9/2023 |
| FR | 3133368 A1 | 9/2023 |
| GB | 2403272 A | 12/2004 |
| JP | 6748802 B2 | 9/2020 |

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

* cited by examiner

TURBINE ENGINE INCLUDING A STEAM SYSTEM

CROSS-REFERENCE TO RELATED APPLICATIONS

This application is a divisional of U.S. patent application Ser. No. 18/538,037 filed on Dec. 13, 2023, the contents of which are hereby incorporated by reference in their entirety.

TECHNICAL FIELD

The present disclosure relates generally to turbine engines including a steam system.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 3A shows a steam injection system according to a preferred embodiment.

DETAILED DESCRIPTION

Figure 1:
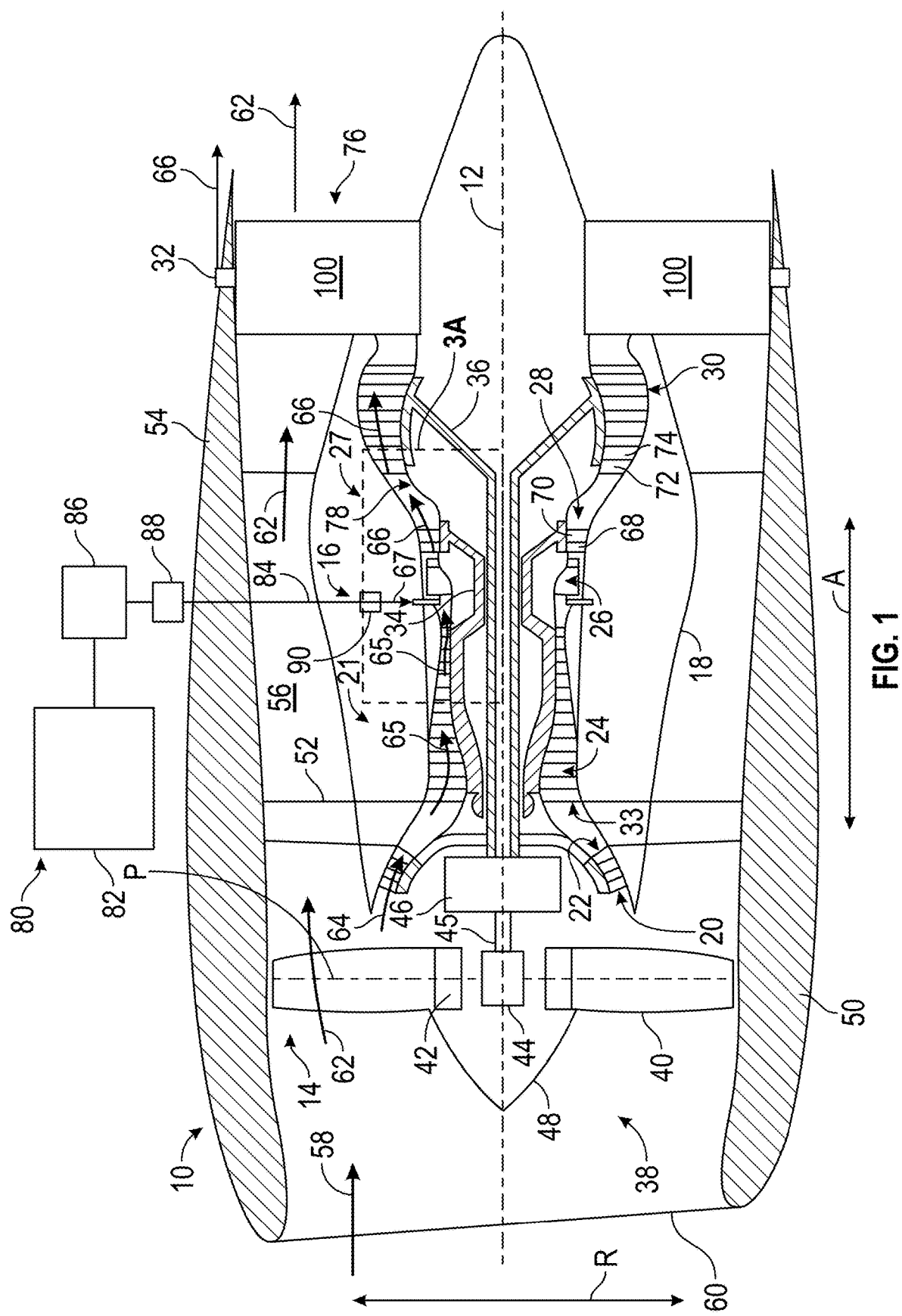
FIG. 1 is a schematic cross-sectional diagram of a turbine engine including a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and the like, may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

References to "inner" and "outer" when discussed in the context of radial directions refer to positions relative to the longitudinal centerline of the component.

As used herein, a "bypass ratio" of a turbine engine is a ratio of bypass air through a bypass of the turbine engine to core air through a core inlet of a turbo-engine of the turbine engine.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section of the turbine engine to generate combustion gases for driving a turbine in the core section. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. After flowing through the steam turbine, the steam may be injected into a core air flow path and, more specifically, into the combustor. To achieve greater benefits of the increased mass flow within the core air flow, the steam is preferably injected into the core air in a range of 20% to 50% of the mass flow through the core air flow path. While some steam flowing through a primary combustion zone of the combustor is beneficial, steam at these mass flows (or water-to-air ratios) may result in flame stability issues and flame dynamics issues during combustion of the fuel, particularly, for highly reactive fuels such as diatomic hydrogen. Instead, as discussed herein, the steam may be injected into the core air flow path at a plurality of locations with a portion of the steam flowing through the primary combustion zone. In this way, the water-to-air ratio of the primary air flowing through the primary combustion zone can be maintained at a level low enough for good flame performance.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20, which, as depicted in FIG. 1, may be annular. As schematically shown in FIG. 1, the compressor section 21 includes a booster or a low-pressure compressor (LPC) 22 followed downstream by a high-pressure compressor (HPC) 24. The combustion section 26 is downstream of the compressor section 21. The turbine section 27 is downstream of the combustion section 26 and includes a high-pressure turbine (HPT) 28 followed downstream by a low-pressure turbine (LPT) 30. The turbo-engine 16 further includes a jet exhaust nozzle section 32 that is downstream of the turbine section 27, a high-pressure (HP) shaft 34 or a spool, and a low-pressure (LP) shaft 36. The compressor section 21, the combustor 26, the turbine section 27, and the one or more core exhaust nozzles 32 together define a core air flow path 33. The HP shaft 34 drivingly connects the HPT 28 to the HPC 24. The HPT 28 and the HPC 24 rotate in unison through the HP shaft 34. The LP shaft 36 drivingly connects the LPT 30 to the LPC 22. The LPT 30 and the LPC 22 rotate in unison through the LP shaft 36.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 are rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 may be reduction gearbox assembly including a plurality of gears for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16, and, with the outer casing 18, define, a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the one or more core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air, also referred to as bypass air 62, is directed or routed into the bypass airflow passage 56, and a second portion of air, also referred to as core air 64, is directed or is routed into the upstream section of the core air flow path 33 through the core inlet 20. The ratio between the bypass air 62 and the core air 64 is known as a bypass ratio. In some embodiments, the bypass ratio is greater than 18:1, enabled by a steam system 100, detailed further below. The pressure of the core air 64 is then increased by the LPC 22, generating compressed air 65. The compressed air 65 is routed through the HPC 24 and further compressed before being directed into the combustor 26, where the compressed air 65 is mixed with fuel 67 and ignited to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and/or kinetic energy from the combustion gases 66 is extracted via one or more stages of HPT stator vanes 68 and HPT rotor blades 70 that are coupled to the HP shaft 34. This causes the HP shaft 34 to rotate, thereby supporting operation of the HPC 24 (self-sustaining cycle). In this way, the combustion gases 66 do work on the HPT 28. The combustion gases 66 are then routed into the LPT 30 and expanded through the LPT 30. Here, a second portion of thermal energy and/or the kinetic energy is extracted from the combustion gases 66 via one or more stages of LPT stator vanes 72 and LPT rotor blades 74 that are coupled to the LP shaft 36. This causes the LP shaft 36 to rotate, thereby supporting operation of the LPC 22 (self-sustaining cycle) and rotation of the fan 38 via the gearbox assembly 46. In this way, the combustion gases 66 do work on the LP turbine 30. One or more stages may be used in each of the HPT 28 and the LPT 30. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66, after being routed through the steam system 100 (as discussed below), are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the turbo-engine 16.

As noted above, the compressed air 65 (the core air 64) is mixed with the fuel 67 in the combustor 26 to form a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
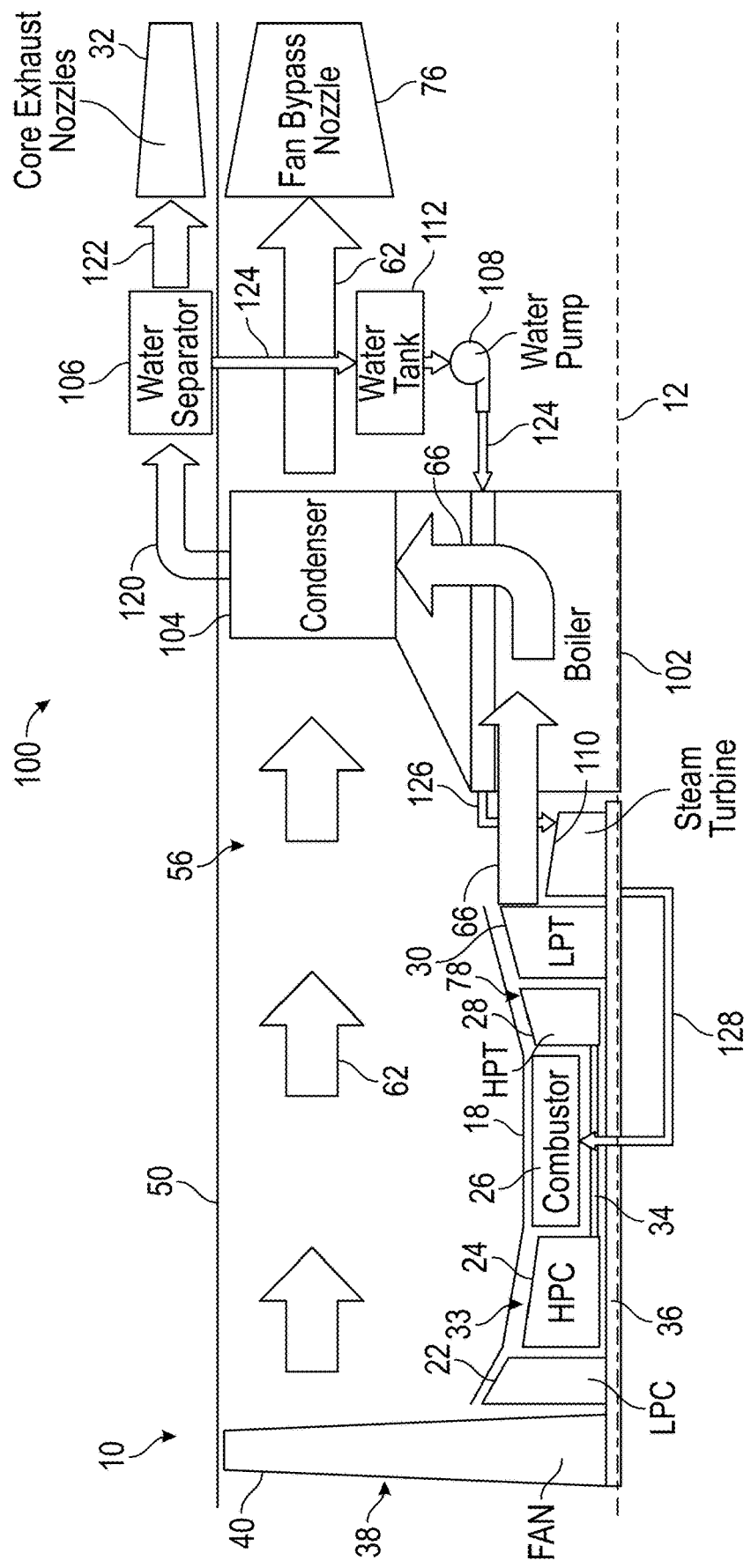
FIG. 2 is a schematic diagram of the turbine engine and the steam system of FIG. 1, according to the present disclosure.

FIG. 2 is a schematic diagram of the turbine engine 10 and the steam system 100 of FIG. 1, according to the present disclosure. For clarity, the turbine engine 10 is shown schematically in FIG. 2 and some components are not shown in FIG. 2. The steam system 100 includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water (e.g., in liquid form) from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the turbo-engine 16. The water separator 106 may be driven to rotate by one of the engine shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water 124 through the boiler 102 where the water 124 is converted back to steam. This steam is sent through the steam turbine 110, and then injected into core air flow path 33, such as into the combustor 26.

The steam system 100 depicted in FIG. 2 includes a water tank 112 fluidly connected to the water separator 106 to collect the water 124 condensed by the condenser 104 and separated by the water separator 106. The water tank 112 may be positioned between the water separator 106 and the water pump 108. The water pump 108 may draw the water 124 from the water tank 112 and direct the water 124, at a desired flow rate, into the boiler 102. In some embodiments, however, the water tank 112 may be omitted from the steam system 100.

In operation, the combustion gases 66, also referred to as exhaust, flow from the LPT 30 into the boiler 102. The combustion gases 66 transfer heat into the water 124 (e.g., in liquid form) within the boiler 102, as detailed further below. The combustion gases 66 then flow into the condenser 104. The condenser 104 condenses the water 124 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 124 from the combustion gases 66, to generate an exhaust-water mixture 120. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 120 flows into the water separator 106. The water separator 106 separates the water 124 from the exhaust of the exhaust-water mixture 120 to generate separate exhaust 122 and the water 124. The exhaust 122 is exhausted out of the turbine engine 10 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 120, and the exhaust 122 through the steam system 100 of the turbine engine 10.

The water pump 108 pumps the water 124 (e.g., in liquid form) through one or more water lines (as indicated by the arrow for the water 124 in FIG. 2) and the water 124 flows through the boiler 102. As the water 124 flows through the boiler 102, the combustion gases 66 flowing through the boiler 102 transfer heat into the water 124 to vaporize the water 124 and to generate steam 126 (e.g., vapor). The steam turbine 110 includes one or more stages of steam turbine blades (not shown) and steam turbine stators (not shown). The steam 126 flows from the boiler 102 into the steam turbine 110, through one or more steam lines (as indicated by the arrow for the steam 126 in FIG. 2), causing the steam turbine blades of the steam turbine 110 to rotate, thereby generating additional work in an output shaft (e.g., one of the engine shafts) connected to the turbine blades of the steam turbine 110.

As noted above, the turbo-engine 16 includes shafts, also referred to as engine shafts, coupling various rotating components of the turbo-engine 16 and other thrust producing components such as the fan 38. In the turbo-engine 16 shown in FIG. 1, these engine shafts include the HP shaft 34 and the LP shaft 36. The steam turbine 110 is coupled to one of the engine shafts of the turbo-engine 16, such as the HP shaft 34 or the LP shaft 36. In the illustrated embodiment, the steam turbine 110 is coupled to the LP shaft 36. As the steam 126 flows from the boiler 102 through the steam turbine 110, the kinetic energy of this gas is converted by the steam turbine 110 into mechanical work in the LP shaft 36. The reduced temperature steam (as steam 128) exiting the steam turbine 110 is then injected into the core air flow path 33, such as into the combustor 26, upstream of the combustor 26, or downstream of the combustor 26. The steam 128 flows through one or more steam lines from the steam turbine 110 to the core air flow path 33. The steam 128 injected into the core air flow path 33 adds mass flow to the core air 64 such that less core air 64 is needed to produce the same amount of work through the turbine section 27. In this way, the steam system 100 extracts additional work from the heat in exhaust gas that would otherwise be wasted. The steam 128 injected into the core air flow path 33 is in a range of 20% to 50% of the mass flow through the core air flow path 33.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the steam system 100 recovers approximately 70% of the water 124 and converts the water 124 into the steam 126. The steam turbine 110 has a pressure expansion ratio in a range of 2:1 to 6:1, the LPT 30 has a pressure expansion ratio in a range of 4.5:1 to 28:1, and the steam 128 contributes to 20% to 50% of the mass flow through the core air flow path 33. The steam turbine 110 expands the steam 126, thereby reducing the energy of the steam 128 exiting the steam turbine 110 and reducing the temperature of the steam 128 to approximately a temperature of the compressed air 65 (see FIG. 1)

that is discharged from the HPC 24. Such a configuration enables the steam 128 to reduce hot spots in the combustor 26 from the combustion of the fuel (e.g., in particular, when the fuel is supercritical hydrogen or gaseous hydrogen).

The steam 128 injected into the core air flow path 33 also enables the HPT 28 to have a greater energy output with fewer stages of the HPT 28 as compared to HPTs without the benefit of the present disclosure. For example, the additional mass flow from the steam 128 through the turbine section 27 helps to produce a greater energy output. In this way, the HPT 28 may only have one stage capable of sustainably driving a greater number of stages of the HPC 24 (e.g., 10, 11, or 12 stages of the HPC 24) due to the higher mass flow (resulting from the steam injection) exiting the combustor 26. The steam 128 that is injected into the core air flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 126, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the turbo-engine 16 provided by the steam 126, 128 injected into the turbo-engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves are preferably positioned between a fourth stage of the HPC 24 and a last stage of the HPC 24. The HPC stator vanes are variable stator vanes, and the one or more compressor bleed valves help to balance the air flow (e.g., the compressed air 65) through all stages of the HPC 24. Such a balance, in combination with the steam 128 injected into the core air flow path 33, enables the number of stages of the HPC 24 to include ten to twelve stages for compression ratios to be greater than 20:1, and, preferably, in a range of 20:1 to 40:1.

The additional work that is extracted by the steam system 100 and the steam 128 injected into the core air flow path 33 enables a size of the turbo-engine 16 (FIG. 1) to be reduced, thereby increasing the bypass ratio of the turbine engine 10, as compared to turbine engines without the benefit of the present disclosure. In this way, the turbine engine 10 has a bypass ratio greater than 18:1, preferably, in a range of 18:1 to 100:1, more preferably, in a range of 25:1 to 85:1, and, most preferably, in a range of 28:1 to 70:1. In this way, the steam system 100 can enable an increased bypass ratio in which the turbine engine 10 can move a greater mass of air through the bypass, reducing the pressure ratio of the fan 38 and increasing the efficiency of the turbine engine 10 as compared to turbine engines without the benefit of the present disclosure.

Figure 3A:
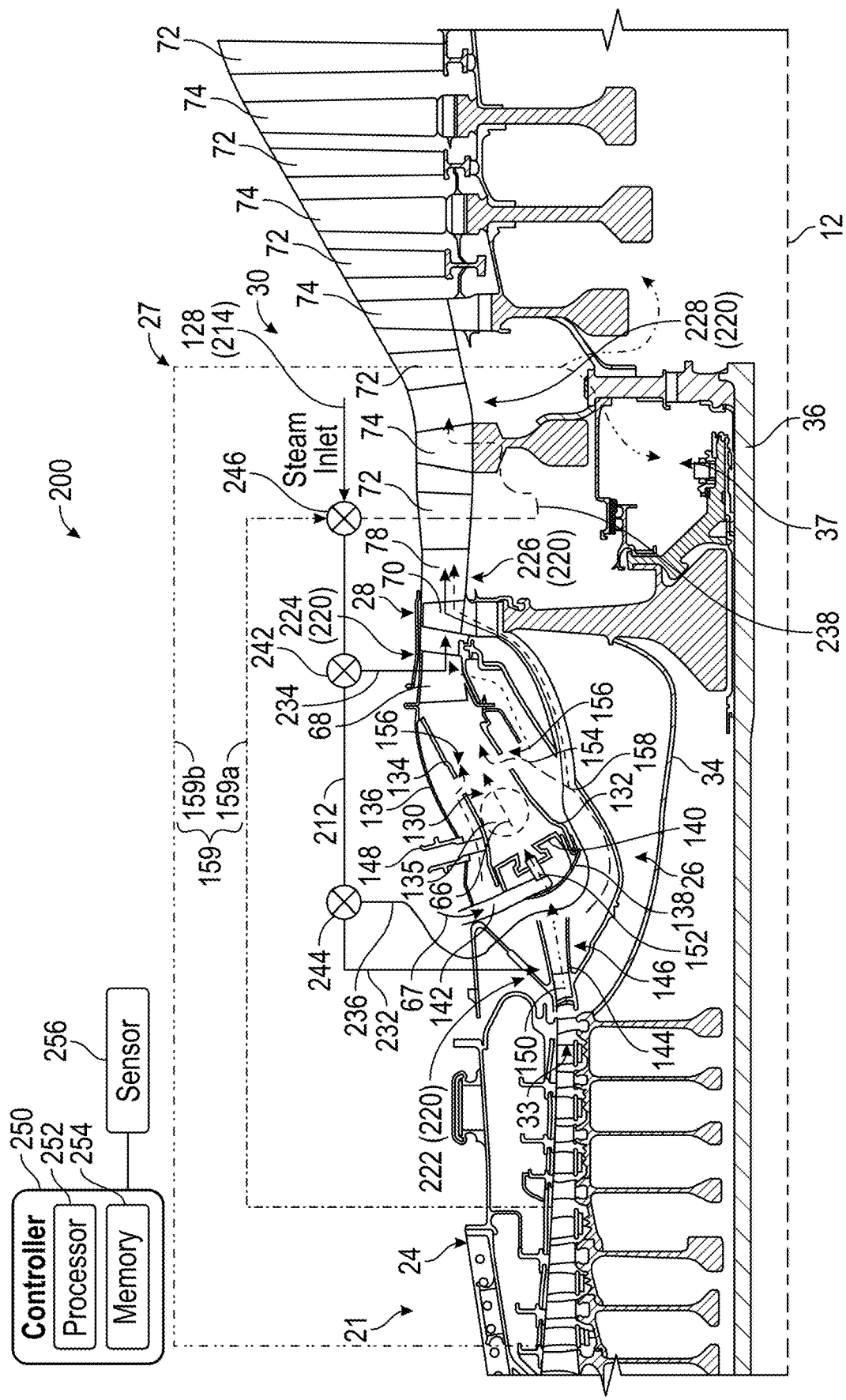
FIG. 3A is a detail view, showing detail 3A in FIG. 1, of a portion of the turbine engine shown in FIG. 1.

FIG. 3A is a detail view, showing detail 3A in FIG. 1, of a portion of the turbo-engine 16. More specifically, FIG. 3A shows the combustor 26, a portion of the HPC 24, the HPT 28, and a portion of the LPT 30. FIG. 3A also shows a first steam injection system 200 according to a preferred embodiment. The combustor 26 is an annular combustor (i.e., annular about the longitudinal centerline axis 12) that includes a combustion chamber 130 defined between an inner liner 132 and an outer liner 134. Each of the inner liner 132 and outer liner 134 is annular about the longitudinal centerline axis 12 of the turbine engine 10 (FIG. 1) and may thus extend in the circumferential direction of the turbine engine 10. The combustor 26 also includes a combustor case 136 that is also annular about the longitudinal centerline axis 12 of the turbine engine 10. The combustor case 136 extends circumferentially around the inner liner 132 and the outer liner 134, and the inner liner 132 and outer liner 134 are located radially inward of the combustor case 136. The combustor 26 also includes a dome 138 mounted to a forward end of each of the inner liner 132 and the outer liner 134. The dome 138 defines an upstream (or forward end) of the combustion chamber 130.

A plurality of mixer assemblies 140 (only one is illustrated in FIG. 3A) are spaced around the dome 138. The plurality of mixer assemblies 140 are circumferentially spaced about the longitudinal centerline axis 12 of the turbine engine 10 (FIG. 1). The mixer assembly 140 may be a swirler/fuel nozzle assembly that includes a fuel nozzle 142 receiving the fuel 67 from the fuel delivery assembly 84 (FIG. 1). The fuel 67 is injected into the combustion chamber 130 through one or more orifices formed in the mixer assembly 140. The mixer assembly 140 may be any suitable mixer assembly including rich burn mixer assemblies or lean burn mixer assemblies, such as a twin annular premixing swirler (TAPS).

As noted above, the compressor section 21, including the HPC 24, pressurizes air, and the combustor 26 receives an annular stream of this pressurized air from a discharge outlet (compressor discharge outlet 144) of the HPC 24. This air may be referred to as compressor discharge pressure air 150. The compressor discharge outlet 144 may be positioned to discharge the compressor discharge pressure air 150 into a mixing chamber 146, and then a portion of the compressor discharge pressure air 150 flows into the mixer assembly 140 as primary air 152. The mixer assembly 140 may include a plurality of swirler vanes as part of a swirler that is used to swirl and to generate turbulence in the primary air 152 flowing through the mixer assembly 140. The fuel nozzle 142 injects fuel 67 into the turbulent airflow of the primary air 152 and the turbulence promotes rapid mixing of the fuel 67 with the primary air 152, generating a fuel-air mixture.

The fuel-air mixture is provided to the combustion chamber 130 from the mixer assembly 140 for combustion. Ignition of the fuel-air mixture is accomplished by an igniter 148, and the resulting combustion gases 66 flow in the axial direction A of the turbine engine 10 toward and into an annular turbine nozzle of the HPT 28. Much of the fuel 67 injected by the fuel nozzle 142 is combusted in a primary combustion zone 135 in the region of the combustion chamber 130 directly downstream of the mixer assembly 140. The turbine nozzle is defined by an annular flow channel that includes a plurality of radially extending, circumferentially-spaced HPT stator vanes 68 that turn the gases so that they flow angularly and impinge upon a plurality of HPT rotor blades 70 of a turbine rotor of the HPT 28. The HPT rotor blades 70 are circumferentially spaced, and the HPT stator vanes 68 are upstream of the HPT rotor blades 70. The rotor may be, for example, a disk or a blisk drivingly connected to the HP shaft 34. As discussed above, the steam system 100 enables the use of a single stage HPT 28 and only one stage is depicted in FIG. 3A, but other HPTs may be used including those with two or more stages.

Another portion of the compressor discharge pressure air 150 is dilution air 154 (also referred to as secondary air). The dilution air 154 flows around the outside of the inner liner 132 and the outer liner 134, and is introduced into the combustion chamber 130 by one or more dilution holes 156 formed in the inner liner 132 and the outer liner 134 at positions downstream of the mixer assembly 140. The dilution air 154 helps quench combustion gases from the primary combustion zone 135 before being introduced into the turbine section 27. The dilution air 154 bypasses the primary combustion zone 135 and is introduced into the combustion chamber 130 downstream of the primary combustion zone 135.

A third portion of the compressor discharge pressure air 150 may be directed into the HPT 28 as HPT cooling air 158. The HPT cooling air 158 may be drawn from the dilution air 154 and directed into the HPT rotor blades 70 and, more specifically, through cooling passages formed within the HPT rotor blades 70 to cool the HPT rotor blades 70.

The steam system 100 (FIG. 2) is fluidly coupled to the core air flow path 33 via a steam delivery assembly 212. The steam delivery assembly 212 includes one or more lines, conduits, pipes, tubes, etc., configured to carry the steam 128 from the steam source, such as the boiler 102, to the core air flow path 33. The steam delivery assembly 212 is fluidly connected to the core air flow path 33 at a plurality of steam injection locations 220 to selectively inject the steam 128 into the core air flow path 33 at each of the plurality of steam injection locations 220.

One of the plurality of steam injection locations 220 is a primary steam injection location 222 located to inject at least a portion of the steam 128 into the primary air 152. The steam 128 can be injected into the primary air 152 at a steam flow rate to achieve a desired water-to-air ratio (WAR) in the primary air 152. More specifically, as depicted in FIG. 3A, the primary steam injection location 222 is positioned to inject primary steam 232 into the mixing chamber 146 to mix with the primary air 152 before flowing through the mixer assembly 140 and upstream of the primary combustion zone 135. As will be discussed further below, the primary steam 232 is a portion of the steam 128 being injected into the core air flow path 33. The primary steam injection location 222 may also be referred to herein as an upstream steam injection location. By injecting the steam 128 into the mixing chamber 146, the steam 128 may also be mixed with the dilution air 154 and the HPT cooling air 158, as will be discussed further below.

The steam 128 may be injected into the core air flow path 33 in a range of 5% to 50% of the mass flow through the core air flow path 33 (i.e., a WAR of 5% to 50%), and this parameter is referred to herein as a total WAR. To achieve the benefits of waste heat recovery discussed herein, this amount of steam 128 (water vapor) is beneficial when flowing through the turbine section 27 and, more specifically, the HPT 28 and the LPT 30. In addition, the desired total WAR may vary throughout the flight of the aircraft based on operating conditions. For example, a total WAR of about 25% may be desired at cruise conditions or at altitude conditions, but, during high-power operations, such as take off and climb, higher total WARs may be desired such as, for example, about 40%. At cruise conditions, the total WAR preferably may be from 5% to 30% and, more preferably, from 10% to 20%. At high-power conditions the total WAR preferably may be from 20% to 45% and, more preferably, from 30% to 40%.

Introducing the steam amounts discussed above such that all of the steam 128 flows through the primary combustion zone 135, may cause issues with the stability of the flame and the flame dynamics in the combustion chamber 130. Preferably, the WAR of the primary air 152 flowing into the primary combustion zone 135 (primary air WAR) may be from 3% to 15% and, more preferably, from 5% to 10%. Keeping the primary air WAR less than 15%, such as less than 10%, helps maintain suitable flame stability and dynamics avoiding, for example, flame out under conditions where a high total WAR is desired. A primary air WAR of 3% or more, such as 5% or more, is preferred to maintain the stability of the flame and prevent hot spots within the combustor, particularly for highly-reactive fuels such as hydrogen. Additionally, primary air WAR values lower than 3% may not show any benefit, such as fuel burn improvement, to the system. With the flow rate of the primary steam 232 injected at the primary steam injection location 222 being limited to achieve the primary air WAR discussed above, the remaining portion of the steam 128 is injected into the core air flow path 33 at one or more locations downstream of the primary combustion zone 135, which are referred to herein as downstream steam injection locations.

With the steam 128 being injected into the mixing chamber 146, some of the primary steam 232 will be combined with the dilution air 154 and the HPT cooling air 158 to be injected into the combustor 26 and into the HPT 28, respectively, as a result of the natural division of the compressor discharge pressure air 150 between the multiple flow paths of the compressor discharge pressure air 150 downstream of the HPC 24. In this way, the steam 128 is introduced into the core air flow path 33 at positions downstream of the primary combustion zone 135, where the dilution air 154 and the HPT cooling air 158 flow into the hot gas path 78. Under certain operating conditions, such as high-power conditions having a relatively high steam demand, however, this natural flow division may not be sufficient to keep the primary air WAR at the levels discussed above. Accordingly, the steam delivery assembly 212 is fluidly connected to the core air flow path 33 to inject the steam 128 at other downstream locations independently of the steam 128 being injected into the primary air 152. In FIG. 3A, the solid arrows are used to illustrate a flow path of the steam 128, the long-dashed lines are used to illustrate a flow of a mixture of compressed air 65 and the steam 128, and the long-dash, double-dot lines are used to illustrate a flow of compressor bleed air 159.

The steam delivery assembly 212 may be fluidly connected to the HPT 28 to inject a portion of the steam 128 directly into the HPT 28. For example, the steam delivery assembly 212 may be fluidly connected to outlets, such as orifices, formed in the HPT stator vanes 68 of the HPT 28 to selectively inject HP turbine nozzle steam 234 into the core air flow path 33. This steam injection location is referred to herein as an HP turbine nozzle steam injection location 224. The first steam injection system 200 includes one or more steam flow control valves that are used to selectively direct the steam 128 into the core air flow path 33, and to control the distribution of the steam 128 between the different injection locations. Each of the steam flow control valves discussed herein is a flow control valve that controls the flow rate of the steam 128 through the flow control valve. The steam control valves may be proportional control valves that are positionable to direct the steam 128 in a proportion to a plurality of different locations, such as a three-way valve positionable to proportion the steam flowing through the steam flow control valve to one of two outlets. Additionally, two or more flow control valves may be configured to produce a similar control, and such flow control valves may have a closed position and a plurality of open positions including a fully open position. The flow control valves may be electrically operable valves, hydraulically operable valves, or pneumatically operable valves. When the flow control valves are hydraulically operable, the hydraulic fluid may be suitable fluids of the turbine engine 10 including, for example, the fuel 67, lubrication oil, and the like. As will be discussed in more detail below, these steam flow control valves are located in the steam delivery assembly 212 to direct a portion of the steam 128 into one or more steam injection locations 220 in the core air flow path 33.

As depicted in FIG. 3A, the first steam injection system 200 includes an HP turbine nozzle steam flow control valve 242 operable to control the flow of the HP turbine nozzle steam 234 into the HPT stator vanes 68. While the HP turbine nozzle steam 234 may be injected as pure steam (without mixing with additional air), the HP turbine nozzle steam 234 may also be mixed with air, such as a portion of the dilution air 154, using, for example one or more steam injector nozzles with an integrated venturi.

The steam delivery assembly 212 may also be fluidly connected directly to the cooling passages formed in the HPT rotor blades 70, bypassing the mixing chamber 146, to inject a portion of the steam 128 (referred to herein as HP turbine blade steam 236) into the HPT 28 via the HPT rotor blades 70. The HP turbine blade steam 236 may be injected through openings (e.g., orifices) formed in the HPT rotor blades 70. As depicted in FIG. 3A, the first steam injection system 200 includes an HP turbine blade steam flow control valve 244 operable to control the flow of the HP turbine blade steam 236 into the HPT rotor blades 70. As with the HP turbine nozzle steam 234, the HP turbine blade steam 236 may be injected into the HPT 28 as pure steam, but the HP turbine blade steam 236 may also be mixed with air, such as the HPT cooling air 158. This steam injection location is referred to herein as an HP turbine blade steam injection location 226.

As noted above, the HPT 28 depicted in FIG. 3A has one stage. If the HPT 28 has more than one stage, the HP turbine nozzle steam 234 and the HP turbine blade steam 236 may be directed through openings in any one or all of the stages.

While having the total WAR of steam flowing through the HPT 28 is preferred, a portion of the steam 128, referred to herein as LP turbine steam 238, may be directed into the LPT 30 through openings formed in one or more of the LPT rotor blades 74, such as, for example, the first stage LPT rotor. More specifically, the LPT rotor blade 74 may include cooling passages formed in the LPT rotor blade 74 through which cooling air, such as compressor bleed air 159 drawn from one of the stages of the HPC 24, flows. The compressor bleed air 159 may then be discharged from the cooling air passages through a plurality of openings (e.g., orifices) formed in the LPT rotor blades 74. Two different airflows of compressor bleed air 159 are depicted in FIG. 3A, specifically, a high-pressure compressor bleed air 159a and a low-pressure compressor bleed air 159b. The high-pressure compressor bleed air 159a is drawn from the later stages of the HPC 24 (e.g., stages six, seven, or eight) and the low-pressure compressor bleed air 159b is drawn from the earlier stages of the HPC 24 (e.g., stages three or four). Accordingly, the high-pressure compressor bleed air 159a has a higher pressure than the low-pressure compressor bleed air 159b. The high-pressure compressor bleed air 159a may be used to cool the first stages of the LPT 30, and the low-pressure compressor bleed air 159b may be used to cool the later stages of the LPT 30 and for other cooling uses, such as an aft sump 37. As depicted in FIG. 3A, the LP turbine steam 238 may be mixed with the compressor bleed air 159 and, more specifically, the high-pressure compressor bleed air 159a to be discharged through the openings in the LPT rotor blade 74. Alternatively, the LP turbine steam 238 may be injected as pure steam. Although described as being injected through the LPT rotor blades 74, the LP turbine steam 238, or a portion thereof, may be additionally or alternatively injected into the LPT 30 through the LPT stator vanes 72. This steam injection location is referred to herein as an LP turbine steam injection location 228. As depicted in FIG. 3A, the first steam injection system 200 includes an LP turbine steam flow control valve 246 operable to control the flow of the LP turbine steam 238 into the LPT 30 and, more specifically the LPT rotor blades 74, and additionally or alternatively the LPT stator vanes 72.

As depicted in FIG. 3A, the steam 128 flows into the steam delivery assembly 212 through a steam inlet 214 and then flows in series through the LP turbine steam flow control valve 246, the HP turbine nozzle steam flow control valve 242, and the HP turbine blade steam flow control valve 244, each of which is located in the steam delivery assembly 212. As discussed above, these steam flow control valves may be proportional control valves. The steam 128 flowing into the steam inlet 214 reaches the first steam flow control valve, which, as depicted in FIG. 3A, is the LP turbine steam flow control valve 246, and a portion of the steam 128 may be directed by the LP turbine steam flow control valve 246 as the LP turbine steam 238 and the remaining steam flows to a second steam flow control valve. As depicted in FIG. 3A, the second steam flow control valve is the HP turbine nozzle steam flow control valve 242, and a portion of the steam may be directed by the HP turbine nozzle steam flow control valve 242 as the HP turbine nozzle steam 234, with the remaining steam flowing to the third steam flow control valve. The third steam flow control valve is the HP turbine blade steam flow control valve 244 and a portion of the steam may be directed by the HP turbine blade steam flow control valve 244 as the HP turbine blade steam 236, with the remaining steam being the primary steam 232. Each of the steam flow control valves may thus be selectively operable to inject the steam 128 at a desired flow rate, a desired total WAR, or both, while maintaining the primary air WAR less than a threshold.

The first steam injection system 200 also includes a controller 250. The controller 250 may be a separate, stand-alone controller operable as described herein, or may be another controller of the turbine engine 10, such as an engine controller. The engine controller may be a Full Authority Digital Engine Control (FADEC). The controller 250 is configured to operate various aspects of the first steam injection system 200, including, in this embodiment, the HP turbine nozzle steam flow control valve 242, the HP turbine blade steam flow control valve 244, and the LP turbine steam flow control valve 246. In this embodiment, the controller 250 is a computing device having one or more processors 252 and one or more memories 254. The processor 252 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 254 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 254 can store information accessible by the processor 252, including computer-readable instructions that can be executed by the processor 252. The instructions can be any set of instructions or a sequence of instructions that, when executed by the processor 252, causes the processor 252 and the controller 250 to perform operations. In some embodiments, the instructions can be executed by the processor 252 to cause the processor 252 to complete any of the operations and functions for which the controller 250 is configured, as will be described further below. The instructions can be software written in any suitable programming language, or can be implemented in hardware. Additionally, and/or alternatively, the instructions can be executed in logically and/or virtually separate threads on the processor 252. The memory 254 can further store data that can be accessed by the processor 252.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3B:
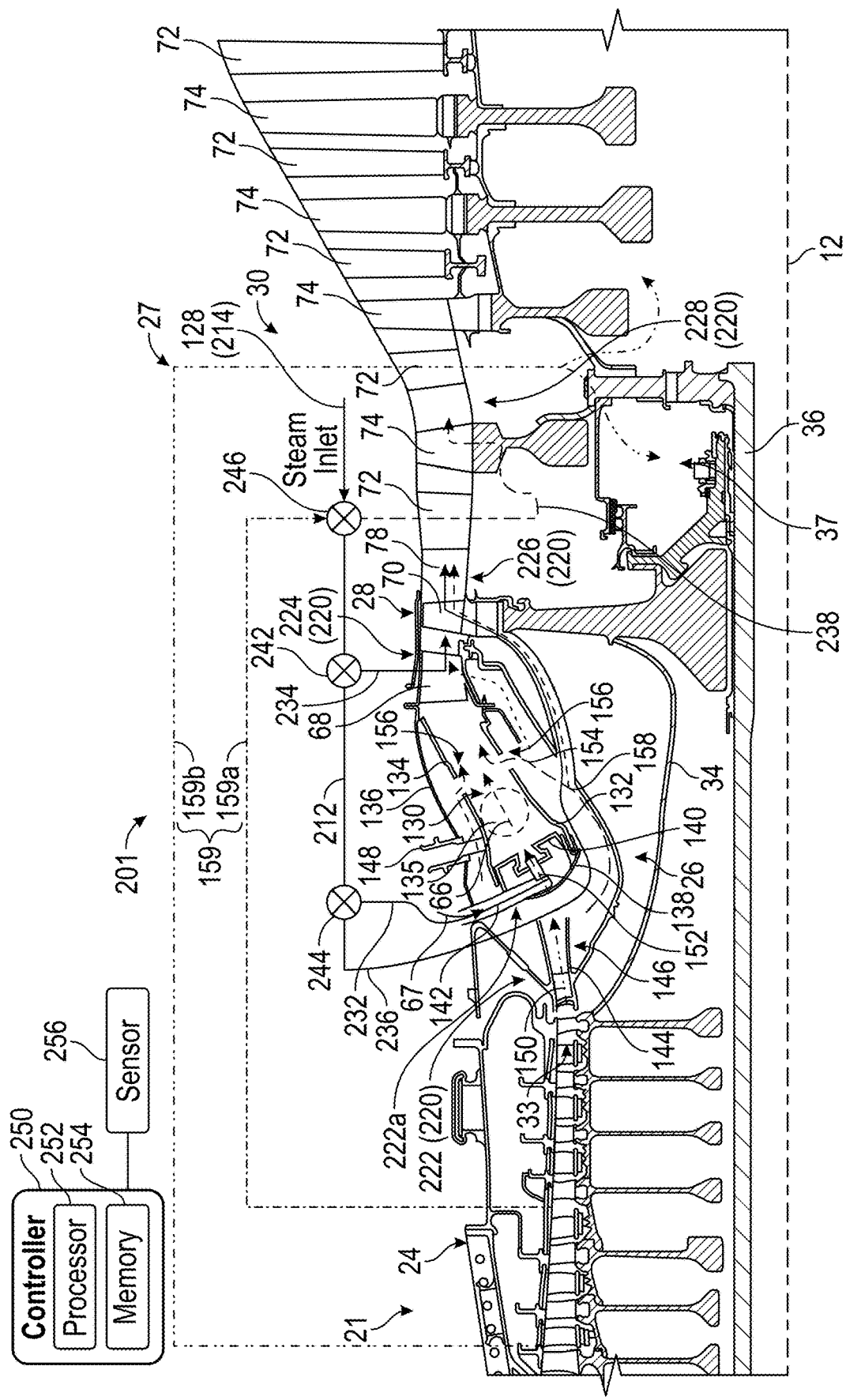
FIG. 3B is a detail view of a portion of the turbine engine showing a steam injection system according to another preferred embodiment.

FIG. 3B is a detail view similar to FIG. 3A showing a portion of the turbo-engine 16 and a second steam injection system 201 according to another preferred embodiment. In the second steam injection system 201 depicted in FIG. 3B, the primary steam 232 is injected at an alternate primary steam injection location 222a. More specifically, the primary steam 232 is injected in the mixer assembly 140. In this way, the primary steam 232 may be injected directly into the primary combustion zone 135. Such a configuration may be used as an alternative to the configuration shown in FIG. 3A or be used in addition to the configuration shown in FIG. 3A such that a portion of the primary steam 232 is injected into the mixing chamber 146 and another portion is injected into the mixer assembly 140. The configuration of the second steam injection system 201 shown in FIG. 3B is otherwise the same as the configuration shown in FIG. 3A, and the description of the components and features of the first steam injection system 200 also applies to the second steam injection system 201.

Figure 4:
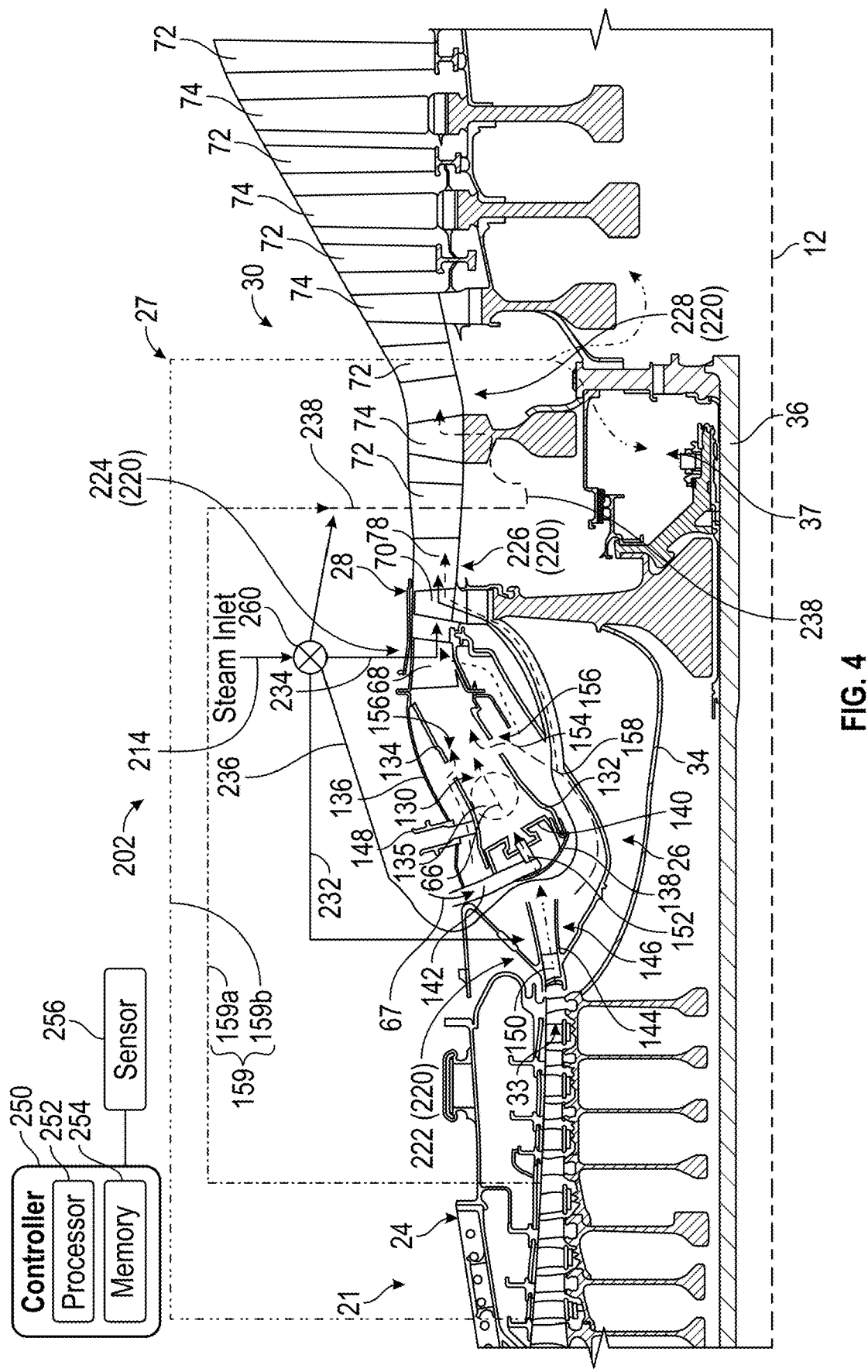
FIG. 4 is a detail view of a portion of the turbine engine showing a steam injection system according to another preferred embodiment.
Figure 5:
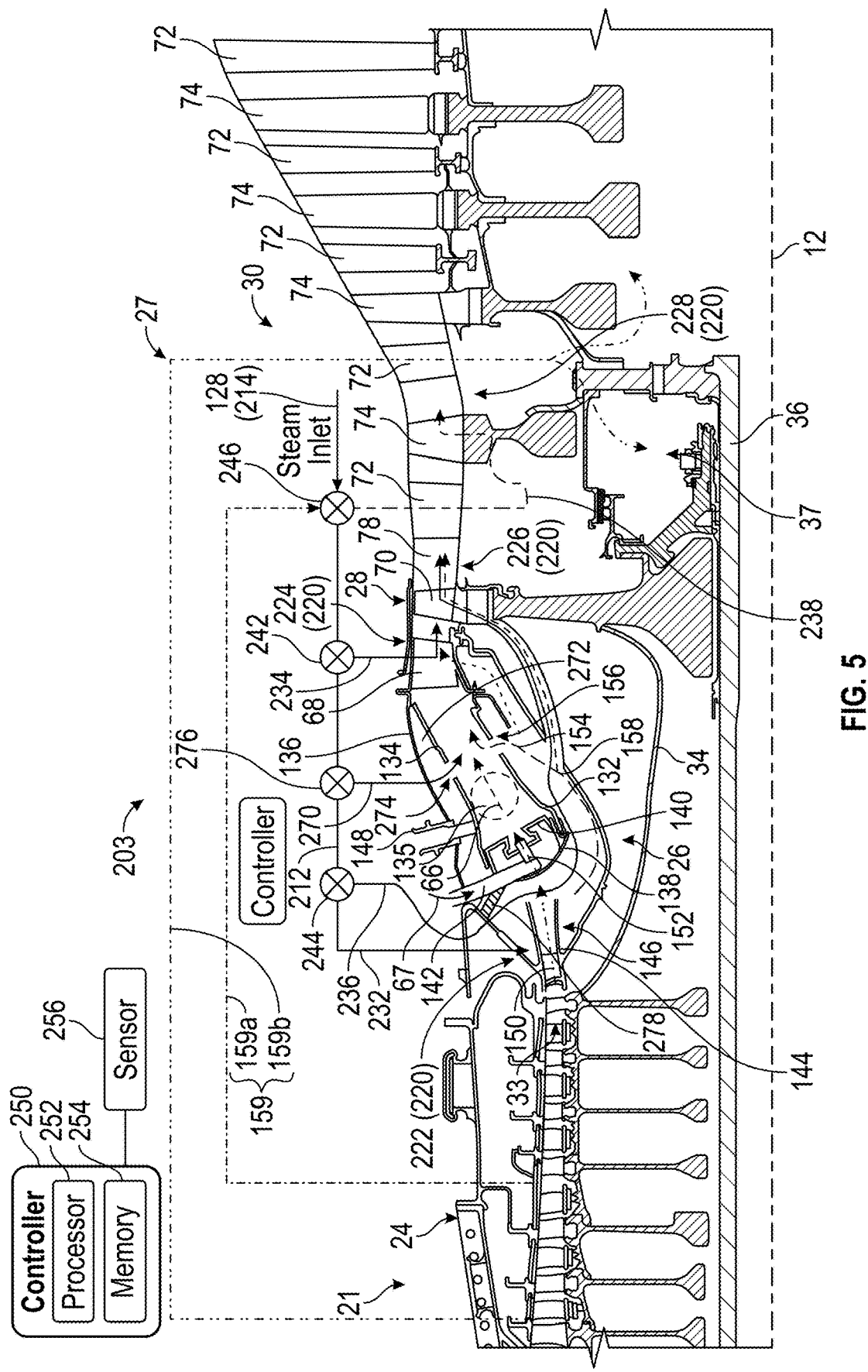
FIG. 5 is a detail view of a portion of the turbine engine showing a steam injection system according to another preferred embodiment.
Figure 6:
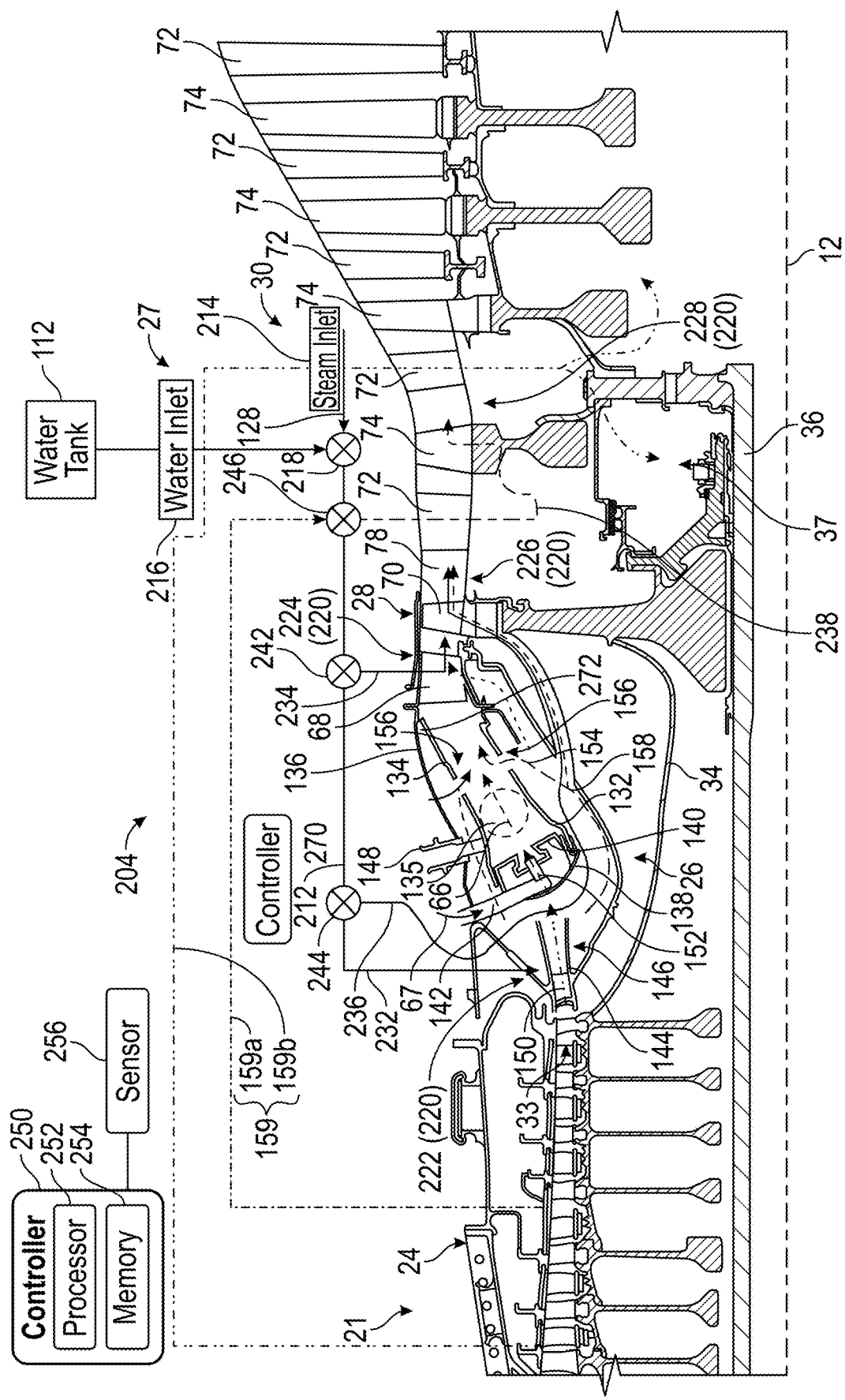
FIG. 6 is a detail view of a portion of the turbine engine showing a steam injection system according to another preferred embodiment.

FIGS. 4 to 6 depict additional embodiments of a steam injection system that may be used in the turbine engine 10 discussed herein. In the following discussion, the same reference numerals will be used to refer to the same or similar components among the steam injection systems discussed herein, including the first steam injection system 200 discussed above. The discussion of these components in one embodiment applies to the other embodiments and a detailed description of such components and features is omitted from the following discussion. In addition, FIGS. 4 to 6 depict the primary steam 232 being injected into the mixing chamber 146, but the configuration shown in FIG. 3B may also be used in these embodiments.

FIG. 4 is a detail view similar to FIG. 3A showing a portion of the turbo-engine 16 and a third steam injection system 202 according to another preferred embodiment. In the first steam injection system 200, a plurality of steam flow control valves is used to direct the flow of steam 128 from the steam inlet 214 to each of the plurality of steam injection locations 220, but other arrangements of the steam flow control valves may be used other than as depicted in FIG. 3A. In the third steam injection system 202 depicted in FIG. 4, for example, one steam flow control valve, referred to herein as a proportional steam flow control valve 260, may be used. The proportional steam flow control valve 260 includes the steam inlet 214 for the steam 128 to flow into the proportional steam flow control valve 260. The proportional steam flow control valve 260 includes a plurality of outlets, with each outlet corresponding to one of the plurality of steam injection locations 220 discussed above. The controller 250 may be operatively coupled to the proportional steam flow control valve 260 to position the valve and to adjust the portion of the steam 128 flowing to each of the plurality of steam injection locations 220 (e.g., adjust the amounts or flow rate of the primary steam 232, the HP turbine nozzle steam 234, the HP turbine blade steam 236, and the LP turbine steam 238).

FIG. 5 is a detail view similar to FIG. 3A showing a portion of the turbo-engine 16 and a fourth steam injection system 203 according to another preferred embodiment. As discussed above, a portion of the steam 128 may be injected into the combustion chamber 130 at a position downstream of the primary combustion zone 135. In the first steam injection system 200 this steam was mixed with the dilution air 154, but, in this embodiment, a portion of the steam 128, as combustor liner steam 270, flows into a combustor liner passage 272 around the combustor liner, such as the outer liner 134 as depicted in FIG. 5, and then into the combustion chamber 130 through steam holes 274 located in the outer liner 134 downstream of the primary combustion zone 135. In addition to adding mass flow to the combustion gases 66, the combustor liner steam 270 may be used to help cool the combustor liner, such as the outer liner 134. The steam holes 274 are another one of the plurality of steam injection locations 220, and the fifth steam injection system 204 includes a combustor liner steam flow control valve 276 operable in a manner similar to the HP turbine nozzle steam flow control valve 242, the HP turbine blade steam flow control valve 244, or the LP turbine steam flow control valve 246 discussed above.

In this embodiment, the combustor liner passage 272 may also be a flow passage for the dilution air 154. A blocker door 278 may be positioned at an upstream end of the combustor liner passage 272. The blocker door 278 is selectively operable to regulate the flow of the dilution air 154 into the combustor liner passage 272. The blocker door 278 may moved by a suitable movement mechanism between a fully closed position, blocking the flow of the dilution air 154 into the combustor liner passage 272, and a fully open position, allowing the dilution air 154 to flow into the combustor liner passage 272. In some embodiments, the blocker door 278 may include a plurality of intermediate positions regulating the flow of the dilution air 154 into the combustor liner passage 272. Closing the blocker door 278 reduces the flow of dilution air 154 into the combustor liner passage 272 and increases the amount of air flowing as primary air 154 and lowers the primary WAR. Accordingly, operation of the blocker door 27, either in combination with the combustor liner steam flow control valve 276 or separately, may control the primary WAR. The blocker door 278 may be operated by a suitable movement mechanism such as an actuator (e.g., a hydraulic actuator or an electric actuator) or motor.

FIG. 6 is a detail view similar to FIG. 3A showing a portion of the turbo-engine 16 and a fifth steam injection system 204 according to another preferred embodiment. Under some conditions, liquid water (e.g., water 124 (FIG. 2)) may be injected into the core air flow path 33 in addition to (or instead of) the steam 128. The steam delivery assembly 212 of the fifth steam injection system 204 depicted in FIG. 6 is fluidly connected to a water source, such as the water tank 112 of the steam system 100, as depicted in FIG. 2. Alternatively, the water source (e.g., water tank 112) may be separate from the steam system 100.

The steam delivery assembly 212 includes a water inlet 216, and an inlet flow control valve 218 fluidly connected to the steam inlet 214 and the water inlet 216. The inlet flow control valve 218 may be a proportional flow control valve that controls the amount of the steam 128 and the water 124 flowing into the steam delivery assembly 212 from the steam inlet 214 and the water inlet 216, respectively. The inlet flow control valve 218 may be operated in a manner similar to the steam flow control valves discussed above. When receiving the water 124, the steam delivery assembly 212 fluidly couples and distributes the water 124 to the plurality of steam injection locations to inject the water 124 at the plurality of steam injection locations. The inlet flow control valve 218 may be used to control the relative amounts of the water 124 and the steam 128 being distributed by the steam delivery assembly 212, and subsequently injected into the core air flow path 33. The inlet flow control valve 218 may be positioned (i.e., operated) to provide either pure steam 128, water 124, or a mixture of both.

Figure 7:
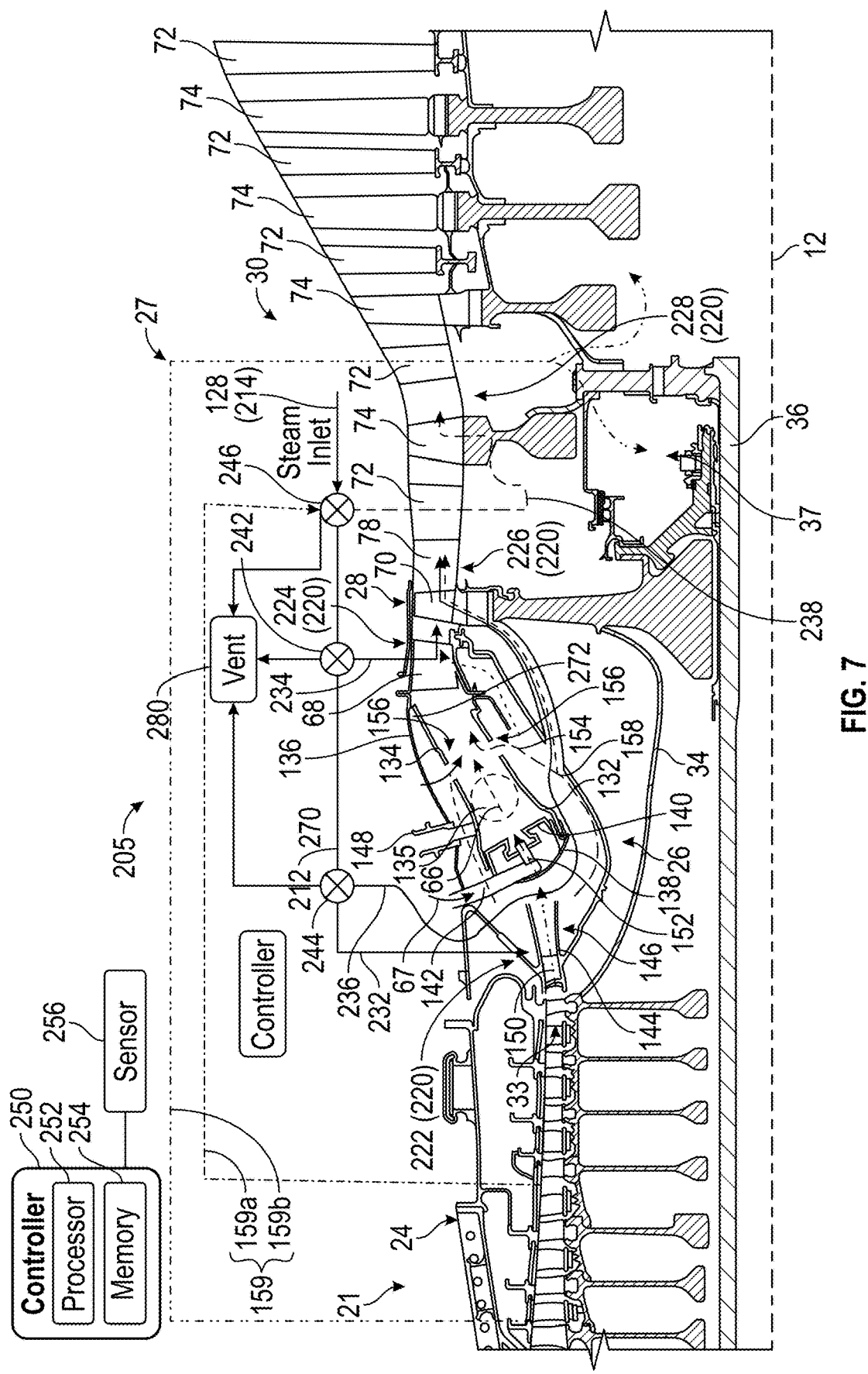
FIG. 7 is a detail view of a portion of the turbine engine showing a steam injection system according to another preferred embodiment.

FIG. 7 is a detail view similar to FIG. 3A showing a portion of the turbo-engine 16 and a sixth steam injection system 205 according to another preferred embodiment. Instead of injecting all of the steam 128 into the core air flow path 33, some of the steam 128 may be diverted from the core air flow path 33, reducing the total amount of steam 128 injected into the core air flow path 33. Accordingly, each of the HP turbine nozzle steam flow control valve 242, the HP turbine blade steam flow control valve 244, and the LP turbine steam flow control valve 246 is fluidly connected to a vent 280 to vent or to bypass the core air flow path 33, and each of these steam flow control valves is operable to direct at least a portion of the steam 128 to the vent 280. The vent 280 may discharge the unwanted steam 128 overboard or back into the steam system 100 such as into the condenser 104, for example, to be recovered by the steam system 100.

By injecting the steam 128 into the core air flow path 33 at the plurality of steam injection locations 220 with any one of the steam injection systems discussed above, the WAR may be selectively controlled along the core air flow path 33. The core air may have a lower WAR in the downstream sections of the core air flow path 33 and, more specifically, the hot gas path 78, with additional steam 128 being added to increase the WAR as the combustion gases 66 flow into the turbine section 27. More specifically, the primary air WAR may be maintained below a threshold to maintain the stability and the dynamics of the flame in the primary combustion zone 135 of the combustion chamber 130, and the primary air WAR threshold may be, for example the upper bound of the ranges discussed above. More preferably, the primary air WAR may be maintained within the ranges discussed above. With the primary air WAR being maintained in the desirable ranges, additional steam 128 may be added downstream to achieve a desired total WAR that is higher than the primary air WAR to provide for efficient operation of the turbine engine 10.

The steam injection systems and the turbine engine 10 discussed herein may be controlled using the following methods. The following discussion will generally reference the first steam injection system 200 shown in FIG. 3A, but is applicable to the other steam injection systems discussed herein. These methods may be implemented by the controller 250 and the controller 250 may be configured to perform the steps of the method discussed below. Additional details of the method are described above relative to the operation and the description of the aforementioned components.

The method of operating the turbine engine 10 may include controlling the amount of steam injected at the upstream steam injection location (i.e., the primary steam injection location 222 or the alternate primary steam injection location 222_a_ (FIG. 3B)) to maintain the WAR of primary air 152 below the primary air water-to-air ratio threshold. The method may also include controlling the amount of steam injected at one or more of the downstream steam injection locations, such as those discussed above, to achieve the total water-to-air ratio in the core air flow path at a position downstream of the combustor. The method may include selectively controlling any one of the steam flow control valves discussed above, to selectively provide the steam 128 in the desired WARs.

The method of operating the turbine engine 10 may further include determining a desired total WAR for the core air 64 flowing through the core air flow path 33. This determination may be based on a desired throttle position or other indication of a desired power level of the turbine engine 10. When the method is executed by the controller 250, the controller 250 may be configured to receive an input, such as an input indicating the power level, and determine the desired total WAR based on the received input. This input may be, for example, a throttle input. Additionally or alternatively, the controller 250 may be coupled to one or more sensors 256, such as a plurality of sensors. Such sensors 256 may be, for example, temperature sensors, pressure sensors, or flow sensors. The sensors 256 may be positioned at various suitable locations within the turbine engine 10 including within the core air flow path 33. For example, one sensor 256 of the plurality of sensors may be positioned upstream of the combustor 26, such as at compressor discharge outlet 144, in the mixing chamber 146, or part of the mixer assembly 140. Another sensor 256 of the plurality of sensors may positioned in the hot gas path 78 (i.e., flow path of the combustion gases 66) downstream of the combustor 26, such as at the nozzle (inlet) or the outlet of the HPT 28 or the LPT 30. The controller 250 may receive the input from the one or more sensors 256 and determine the power level of the turbine engine 10 or flow rate of the core air 64 based on the input received from the sensors 256.

When the steam injection system includes a vent 280, such as the sixth steam injection system 205 shown in FIG. 7, the method may also include, when the total steam provided is more than the desired total WAR, or the method may include operating one or more of the steam control valves to divert at least a portion of the steam 128 to the vent 280. The vent 280 may be particularly useful during a transient condition or a failure condition, such as flame out or in-flight engine restart. Injecting steam into the core air flow path 33 or at least the combustor 26 may create difficulties for reignition, and, thus, the method may include operating one or more of the steam control valves to divert the steam 128 to the vent 280 when a failure condition has occurred. The vent 280 may be fluidly coupled to an opening to vent the steam 128 overboard, such as through one of the exhaust nozzles (e.g., the core exhaust nozzles 32 (FIG. 1) or the fan bypass nozzle 76 (FIG. 1)) or, alternatively, to vent the steam 128 back into the steam system 100 (FIG. 2), such as into the condenser 104 (FIG. 2).

Further aspects of the present disclosure are provided by the subject matter of the following clauses.

A turbine engine for an aircraft. The turbine engine includes a turbo-engine, a fan having a fan shaft coupled to the turbo-engine, and a steam system. The turbo-engine includes a core air flow path for core air to flow therethrough, a combustor, an engine shaft, and a turbine. The combustor is positioned in the core air flow path to receive compressed air and fluidly coupled to a fuel source to receive fuel. The fuel is injected into the combustor to mix with the compressed air to generate a fuel and air mixture. The fuel and air mixture is combusted in a primary combustion zone of the combustor to generate combustion gases. The turbine is located downstream of the combustor to receive the combustion gases and to cause the turbine to rotate. The turbine is coupled to the engine shaft. The steam system extracts water from the combustion gases and vaporizes the water to generate steam. The steam system is fluidly coupled to the core air flow path at a plurality of steam injection locations to selectively inject the steam into the core air flow path at each of the plurality of steam injection locations to add mass flow to the core air. The plurality of steam injection locations include (i) an upstream steam injection location located to inject steam into the core air flow path at the primary combustion zone of the combustor or upstream thereof and (ii) a downstream steam injection location located to inject steam into the core air flow path downstream of the primary combustion zone. The steam system includes a steam flow control valve operable to change a distribution of the steam being injected into the core air flow path at the plurality of steam injection locations.

The turbine engine of the preceding clause, wherein the downstream steam injection location is one downstream steam injection location of a plurality of downstream steam injection locations.

The turbine engine of any preceding clause, wherein the steam flow control valve is a proportional steam flow control valve fluidly connected to each downstream steam injection location of the plurality of downstream steam injection locations, the proportional steam flow control valve being operable to control the distribution of the steam to each of the plurality of downstream steam injection locations.

The turbine engine of any preceding clause, wherein the steam flow control valve is fluidly connected to the upstream steam injection location to control the distribution of the steam to the upstream steam injection location.

The turbine engine of any preceding clause, wherein the steam flow control valve is one steam flow control valve of a plurality of the steam flow control valves operable to change the distribution of the steam being injected into the core air flow path by the plurality of steam injection locations.

The turbine engine of any preceding clause, wherein the turbine is a high-pressure turbine, the downstream steam injection location being in the high-pressure turbine.

The turbine engine of any preceding clause, wherein the steam system includes a high-pressure turbine steam flow control valve to control the flow of steam to the high-pressure turbine.

The turbine engine of any preceding clause, wherein the high-pressure turbine includes a turbine rotor including a plurality of rotor blades, the downstream steam injection location being the plurality of rotor blades.

The turbine engine of the preceding clause, wherein cooling air is provided to the plurality of rotor blades, the steam being mixed with the cooling air.

The turbine engine of any preceding clause, wherein the high-pressure turbine includes a plurality of stator vanes, the downstream steam injection location being the plurality of stator vanes.

The turbine engine of any preceding clause, wherein the high-pressure turbine includes a turbine rotor including a plurality of rotor blades, the plurality of rotor blades being downstream of the plurality of stator vanes.

The turbine engine of the preceding clause, wherein cooling air is provided to the plurality of stator vanes, the steam being mixed with the cooling air.

The turbine engine of any preceding clause, wherein the turbo-engine includes a high-pressure compressor positioned in the core air flow path upstream of the combustor to generate the compressed air.

The turbine engine of any preceding clause, wherein the engine shaft is a high-pressure shaft.

The turbine engine of any preceding clause, wherein the high-pressure compressor is driven by the high-pressure shaft to compress the core air flowing through the core air flow path and to generate the compressed air.

The turbine engine of any preceding clause, wherein the turbo-engine includes a low-pressure compressor positioned in the core air flow path upstream of the high-pressure compressor to generate the compressed air.

The turbine engine of any preceding clause, wherein the turbo-engine includes a low-pressure turbine positioned in the core air flow path downstream of the high-pressure turbine to receive the combustion gases and to cause the turbine to rotate.

The turbine engine of any preceding clause, wherein the turbo-engine includes a low-pressure shaft, the low-pressure turbine coupled to the low-pressure shaft.

The turbine engine of any preceding clause, wherein the downstream steam injection location in the high-pressure turbine is one downstream steam injection location of a plurality of downstream steam injection locations.

The turbine engine of the preceding clause, wherein another one of the plurality of downstream steam injection locations is in the low-pressure turbine.

The turbine engine of the preceding clause, wherein the low-pressure turbine includes a turbine rotor including a plurality of rotor blades, the downstream steam injection location being the plurality of rotor blades.

The turbine engine of any preceding clause, wherein another one of the plurality of downstream steam injection locations is a portion of the combustor downstream of the primary combustion zone.

The turbine engine of the preceding clause, wherein the combustor includes a combustor liner, the downstream steam injection location being holes formed in the combustor liner.

The turbine engine of any preceding clause, wherein the turbo-engine includes a compressor positioned in the core air flow path upstream of the combustor to compress core air to generate the compressed air.

The turbine engine of the preceding clause, wherein the compressor is driven by the high-pressure shaft to compress the core air flowing through the core air flow path and to generate the compressed air.

The turbine engine of any preceding clause, wherein the turbo-engine includes a mixing chamber positioned upstream of the combustor and downstream of the compressor to receive the compressed air, the upstream steam injection location being the mixing chamber.

The turbine engine of the preceding clause, wherein the steam is mixed with air in the mixing chamber to generate a steam-air mixture.

The turbine engine of the preceding clause, wherein a portion of the steam-air mixture is provided to the combustor as primary air.

The turbine engine of any preceding clause, wherein a portion of the steam-air mixture is injected into the combustion gases downstream of the primary combustion zone.

The turbine engine of any preceding clause, wherein the turbine is a high-pressure turbine, the portion of the steam-air mixture injected into the combustion gases being injected in the high-pressure turbine.

The turbine engine of the preceding clause, wherein the high-pressure turbine includes a turbine rotor including a plurality of rotor blades, the portion of the steam-air mixture injected into the combustion gases being injected through the plurality of rotor blades.

The turbine engine of any preceding clause, wherein the high-pressure turbine includes a plurality of stator vanes, the portion of the steam-air mixture injected into the combustion gases being injected through the plurality of stator vanes.

The turbine engine of any preceding clause, wherein a portion of the steam-air mixture is injected into the combustion chamber downstream of the primary combustion zone.

The turbine engine of the preceding clause, wherein the combustor includes a combustor liner, the portion of the steam-air mixture injected into the combustion chamber downstream of the primary combustion zone being injected through holes formed in the combustor liner.

The turbine engine of any preceding clause, wherein the downstream steam injection location is a portion of the combustor downstream of the primary combustion zone.

The turbine engine of the preceding clause, wherein the combustor includes a combustor liner, the downstream steam injection location being holes formed in the combustor liner.

The turbine engine of any preceding clause, wherein the turbine is a low-pressure turbine, the downstream steam injection location being in the low-pressure turbine.

The turbine engine of the preceding clause, wherein the low-pressure turbine includes a turbine rotor including a plurality of rotor blades, the downstream steam injection location being the plurality of rotor blades.

The turbine engine of any preceding clause, wherein the steam system includes a steam delivery assembly including a steam inlet to receive the steam generated by steam system and a water inlet fluidly coupled to a water source to receive water from the water source.

The turbine engine of the preceding clause, wherein the steam delivery assembly is fluidly coupled to the plurality of steam injection locations to inject the steam and the water into the core air flow path at the plurality of steam injection locations.

The turbine engine of any preceding clause, wherein the steam flow control valve is located in the steam delivery assembly and operable to change the distribution of the steam, the water, or both being injected into the core air flow path.

The turbine engine of any preceding clause, wherein the steam delivery assembly further includes an inlet flow control valve fluidly connected to the steam inlet and the water inlet, and is operable to control relative amounts of the water and the steam being distributed by the steam delivery assembly.

The turbine engine of the preceding clause, wherein the water source is a water tank.

The turbine engine of the preceding clause, wherein the steam system includes the water tank.

The turbine engine of the preceding clause, wherein the water tank is an accumulator positioned downstream of the water separator to collect and to store water.

The turbine engine of any preceding clause, wherein the steam system includes a vent, and the steam flow control valve is fluidly connected to the vent and operable to direct at least a portion of the steam to the vent, bypassing the core air flow path.

The turbine engine of any preceding clause, further comprising a controller operatively coupled to the steam flow control valve to adjust the position of the steam flow control valve.

The turbine engine of the preceding clause, wherein the controller is configured to position the steam flow control valve to distribute the steam to the plurality of steam injection locations to provide a desired total water-to-air ratio for the core air flowing through the core air flow path.

The turbine engine of any preceding clause, wherein the controller is configured to maintain a water-to-air ratio of primary air flowing into the primary combustion zone below a primary air water-to-air ratio threshold.

The turbine engine of the preceding clause, wherein the primary air water-to-air ratio threshold is from 3% to 15%.

The turbine engine of any preceding clause, wherein the primary air water-to-air ratio threshold is from 5% to 10%.

The turbine engine of any preceding clause, further comprising a sensor located in the core air flow path and coupled to the controller, the controller being configured to receive an input from the sensor and to adjust the position the steam flow control valve based on the input received from the sensor.

The turbine engine of any preceding clause, further comprising a plurality of sensors located in the core air flow path and coupled to the controller, the controller being configured to receive an input from each sensor of the plurality of sensors and to adjust the position of the steam flow control valve based on the input received from the plurality of sensors.

The turbine engine of the preceding clause, wherein one sensor of the plurality of sensors is positioned upstream of the combustor.

The turbine engine of the preceding clause, wherein one sensor of the plurality of sensors is positioned upstream of the combustor and downstream of a compressor.

The turbine engine of any preceding clause, wherein one sensor of the plurality of sensors is positioned in a flow path of the combustion gases downstream of the combustor.

The turbine engine of any preceding clause, wherein one sensor of the plurality of sensors is positioned in a flow path of the combustion gases downstream of the combustor and upstream of the turbine.

The turbine engine of any preceding clause, wherein the engine shaft is a low-pressure shaft and the turbine is a low-pressure turbine.

The turbine engine of any preceding clause, wherein the fan shaft is coupled to the low-pressure shaft to be driven by the low-pressure shaft.

The turbine engine of any preceding clause, further comprising a nacelle circumferentially surrounding the fan.

The turbine engine of any preceding clause, wherein the fan includes a plurality of fan blades that rotates to generate a volume of air.

The turbine engine of the preceding clause, wherein the nacelle defines a bypass airflow passage between the nacelle and the turbo-engine. The volume of air from the fan is split and flows into the bypass airflow passage as bypass air and flows into the core air flow path as the core air.

The turbine engine of any preceding clause, wherein the steam system includes a boiler located downstream of the combustor, the boiler receiving the extracted water and being fluidly connected to the combustor to receive the combustion gases and to boil the water to generate the steam.

The turbine engine of the preceding clause, wherein the steam system includes a steam turbine. The steam turbine is fluidly coupled to the boiler to receive the steam from the boiler and to cause the steam turbine to rotate.

The turbine engine of the preceding clause, wherein the steam turbine is coupled to the engine shaft.

The turbine engine of any preceding clause, wherein the steam system includes a steam delivery assembly fluidly coupled to the plurality of steam injection locations to inject the steam and the water into the core air flow path at the plurality of steam injection locations.

The turbine engine of any preceding clause, wherein the steam delivery assembly includes a steam inlet to receive the steam generated by steam system.

The turbine engine of any preceding clause, wherein the steam flow control valve is located in the steam delivery assembly and operable to change the distribution of the steam being injected into the core air flow path.

The turbine engine of any preceding clause, wherein the steam delivery assembly is fluidly coupled to the steam system downstream of the steam turbine to receive the steam from the steam turbine.

The turbine engine of any preceding clause, wherein the steam system includes a condenser downstream of the turbine to receive the combustion gases and to condense the water from the combustion gases.

The turbine engine of the preceding clause, wherein the condenser is located downstream of the boiler.

The turbine engine of any preceding clause, wherein the condenser is located in the bypass airflow passage for bypass air to cool the combustion gases and to condense the water from the combustion gases.

The turbine engine of any preceding clause, wherein the steam system includes a water separator located downstream of the condenser, the water separator separating the water from an exhaust-water mixture.

The turbine engine of any preceding clause, wherein the water separator is fluidly connected to the boiler to provide the water to the boiler.

The turbine engine of the preceding clause, wherein the water separator is a cyclonic separator.

The turbine engine of any preceding clause, further comprising a water pump in fluid communication with the water separator and with the boiler to direct the flow of water from the water separator into the boiler.

A method of operating a turbine engine for an aircraft having a steam system.

The method comprises injecting steam into a core air flow path at a plurality of steam injection locations. The plurality of steam injection locations includes (i) an upstream steam injection location located to inject steam into the core air flow path at a primary combustion zone of a combustor or upstream thereof and (ii) a downstream steam injection location located to inject steam into the core air flow path downstream of the primary combustion zone. The method also includes controlling the amount of steam injected at an upstream steam injection location to maintain the water-to-air ratio of primary air flowing into the primary combustion zone below a primary air water-to-air ratio threshold, and controlling the amount of steam injected at the downstream steam injection location to achieve a desired total water-to-air ratio in the core air flow path at a position downstream of the combustor.

The method of the preceding clause, wherein the primary air water-to-air ratio threshold is from 3% to 15%.

The method of any preceding clause, wherein the primary air water-to-air ratio threshold is from 5% to 10%.

The method of any preceding clause, further comprising determining the desired total water-to-air ratio for core air flowing through a core air flow path of the turbine engine.

The method of any preceding clause operating the turbine engine of any preceding clause.

The turbine engine of any preceding clause, further comprising a controller configured to execute the method of any preceding clause.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A turbine engine for an aircraft, the turbine engine comprising:
   a turbo-engine including:
   a core air flow path for core air to flow therethrough;
   a combustor positioned in the core air flow path to receive compressed air and fluidly coupled to a fuel source to receive fuel, the fuel being injected into the combustor to mix with the compressed air to generate a fuel and air mixture, the fuel and air mixture being combusted in a primary combustion zone of the combustor to generate combustion gases;
   an engine shaft; and
   a turbine located downstream of the combustor to receive the combustion gases and to cause the turbine to rotate, the turbine coupled to the engine shaft;
   a fan having a fan shaft coupled to the turbo-engine; and
   a steam system extracting water from the combustion gases and vaporizing the water to generate steam, the steam system including:
   a steam delivery assembly with a steam inlet to receive the steam generated by the steam system, and a water inlet fluidly coupled to a water source to receive water from the water source, the water inlet being disposed in the steam delivery assembly to add water to the steam in the steam delivery assembly, the steam delivery assembly being fluidly coupled to the core air flow path at a plurality of steam injection locations to selectively inject the steam and the water into the core air flow path at each of the plurality of steam injection locations to add mass flow to the core air, the plurality of steam injection locations including (i) an upstream steam injection location located to inject steam into the core air flow path at the primary combustion zone of the combustor or upstream thereof, and (ii) a downstream steam injection location located to inject steam into the core air flow path downstream of the primary combustion zone; and a steam flow control valve located in the steam delivery assembly and operable to change a distribution of the steam, the water, or both, being injected into the core air flow path at the plurality of steam injection locations.

2. The turbine engine of claim 1, wherein the turbo-engine includes:
a compressor positioned in the core air flow path upstream of the combustor to compress core air to generate the compressed air; and
a mixing chamber positioned upstream of the combustor and downstream of the compressor to receive the compressed air, the upstream steam injection location being the mixing chamber.

3. The turbine engine of claim 1, wherein the steam flow control valve is one steam flow control valve of a plurality of the steam flow control valves operable to change the distribution of the steam, the water, or both being injected into the core air flow path by the plurality of steam injection locations.

4. The turbine engine of claim 1, wherein the steam system includes a vent, and the steam flow control valve is fluidly connected to the vent and operable to direct at least a portion of the steam to the vent bypassing the core air flow path.

5. The turbine engine of claim 1, wherein the steam delivery assembly further includes an inlet flow control valve fluidly connected to the steam inlet and the water inlet and operable to control relative amounts of the water and the steam being distributed by the steam delivery assembly.

6. The turbine engine of claim 1, wherein the downstream steam injection location is a portion of the combustor downstream of the primary combustion zone.

7. The turbine engine of claim 6, wherein the combustor includes a combustor liner, the downstream steam injection location being holes formed in the combustor liner.

8. The turbine engine of claim 1, wherein the turbine is a low-pressure turbine, the downstream steam injection location being in the low-pressure turbine.

9. The turbine engine of claim 8, wherein the low-pressure turbine includes a turbine rotor including a plurality of rotor blades, the downstream steam injection location being the plurality of rotor blades.

10. The turbine engine of claim 1, wherein the downstream steam injection location is one downstream steam injection location of a plurality of downstream steam injection locations.

11. The turbine engine of claim 10, wherein the steam flow control valve is a proportional steam flow control valve fluidly connected to each downstream steam injection location of the plurality of downstream steam injection locations, the proportional steam flow control valve being operable to control the distribution of the steam, the water, or both to each of the plurality of downstream steam injection locations.

12. The turbine engine of claim 11, wherein the steam flow control valve is fluidly connected to the upstream steam injection location to control the distribution of the steam, the water, or both to the upstream steam injection location.

13. The turbine engine of claim 1, wherein the turbine is a high-pressure turbine, the downstream steam injection location being in the high-pressure turbine.

14. The turbine engine of claim 13, wherein the high-pressure turbine includes a turbine rotor including a plurality of rotor blades, the downstream steam injection location being the plurality of rotor blades.

15. The turbine engine of claim 13, wherein the high-pressure turbine includes a plurality of stator vanes, the downstream steam injection location being the plurality of stator vanes.

16. The turbine engine of claim 15, wherein the high-pressure turbine includes a turbine rotor including a plurality of rotor blades, the plurality of rotor blades being downstream of the plurality of stator vanes.

17. The turbine engine of claim 1, further comprising a controller operatively coupled to the steam flow control valve to adjust the position of the steam flow control valve, the controller being configured to position the steam flow control valve to distribute the steam to the plurality of steam injection locations to provide a desired total water-to-air ratio for the core air flowing through the core air flow path and to maintain a water-to-air ratio of primary air flowing into the primary combustion zone below a primary air water-to-air ratio threshold.

18. The turbine engine of claim 17, further comprising a sensor located in the core air flow path and coupled to the controller, the controller being configured to receive an input from the sensor and to adjust the position the steam flow control valve based on the input received from the sensor.

19. The turbine engine of claim 17, further comprising a plurality of sensors located in the core air flow path and coupled to the controller, the controller being configured to receive an input from each sensor of the plurality of sensors and to adjust the position of the steam flow control valve based on the input received from the plurality of sensors, one sensor of the plurality of sensors being positioned upstream of the combustor and another sensor of the plurality of sensors being positioned in a flow path of the combustion gases downstream of the combustor.

20. The turbine engine of claim 17, wherein the primary air water-to-air ratio threshold is from 3% to 15%.

* * * * *